(12) United States Patent
Childers

(10) Patent No.: US 7,353,834 B2
(45) Date of Patent: Apr. 8, 2008

(54) VARIABLE RATE PRESSURE REGULATOR

(75) Inventor: Ronald E. Childers, South Jordan, UT (US)

(73) Assignee: Dresser, Inc., Addison, TX (US)

( * ) Notice: Subject to any disclaimer, the term of this patent is extended or adjusted under 35 U.S.C. 154(b) by 269 days.

(21) Appl. No.: 11/263,530

(22) Filed: Oct. 31, 2005

(65) Prior Publication Data

US 2007/0044845 A1    Mar. 1, 2007

Related U.S. Application Data

(60) Provisional application No. 60/711,313, filed on Aug. 25, 2005.

(51) Int. Cl.
*G05D 16/02* (2006.01)
(52) U.S. Cl. .................. 137/14; 137/494; 137/505.11; 137/505.47; 251/232; 251/238
(58) Field of Classification Search ........... 137/505.11, 137/505.46, 505.47, 12, 14, 494; 251/58, 251/232, 238
See application file for complete search history.

(56) References Cited

U.S. PATENT DOCUMENTS

| | | | | | |
|---|---|---|---|---|---|
| 885,681 | A | * | 4/1908 | Weeks ................. | 137/505.31 |
| 1,176,050 | A | * | 3/1916 | Gray ................... | 137/505.47 |
| 1,546,047 | A | * | 7/1925 | Thrall .................. | 137/505.36 |
| 2,869,575 | A | * | 1/1959 | Hutchens ............. | 137/505.11 |
| 3,032,056 | A | * | 5/1962 | Riley et al. .......... | 137/505.47 |
| 3,818,932 | A | * | 6/1974 | Doe et al. ............ | 137/494 |
| 4,064,890 | A | * | 12/1977 | Collins et al. ....... | 137/505.11 |
| 4,266,538 | A | * | 5/1981 | Ruchti ................. | 137/494 |
| 4,782,850 | A | | 11/1988 | Duffy et al. | |
| 5,056,550 | A | | 10/1991 | Richardson | |
| 5,875,807 | A | * | 3/1999 | Schulze ............... | 251/214 |
| 6,354,319 | B1 | | 3/2002 | Mooney | |
| 2004/0187930 | A1 | * | 9/2004 | Hawkins et al. .... | 137/505.47 |

FOREIGN PATENT DOCUMENTS

CA         1250207         2/1989

OTHER PUBLICATIONS

Sensus Metering Systems. Regulator Installation and Maintenance Instructions, and Parts List. pp. 1-7. Dated Jan. 2005.

* cited by examiner

*Primary Examiner*—Stephen M. Hepperle
(74) *Attorney, Agent, or Firm*—Fish & Richardson P.C.

(57) ABSTRACT

A pressure regulator valve including a valve seat separating a fluid flowpath into an upstream region and a downstream region. A valve closure member is mounted on a valve stem, the valve stem operable to vary a separation between the valve seat and the valve closure member. A diaphragm is mounted in a housing, mobile portions of the diaphragm responding to changes of pressure in the downstream region by changing position relative to the housing. A diaphragm stem is attached to the diaphragm such that movement of the mobile portions of the diaphragm causes movement of the diaphragm stem. A linkage mechanically couples the diaphragm stem to the valve stem. The linkage includes four connected links, the links attached to each other at connection points. The linkage having a mechanical advantage which varies as the positions of the diaphragm stem and valve stem change.

23 Claims, 6 Drawing Sheets

VARIABLE RATE PRESSURE REGULATOR

CROSS-REFERENCE TO RELATED APPLICATIONS

This application claims priority based on U.S. Provisional Patent Application No. 60/711,313 for "Variable Rate Pressure Regulator" filed Aug. 25, 2005, the disclosure of which is incorporated herein by reference in its entirety.

TECHNICAL FIELD

This invention relates to regulator valves, and more particularly to diaphragm type regulator valves.

BACKGROUND

Diaphragm type regulator valves are used in applications that include, for example, the delivery of natural gas. Such valves can be configured with a spring biasing the diaphragm against resistance provided by pressure in a chamber on the other side of the diaphragm. Fluid connections between the chamber and the downstream side of the regulator valve cause pressure in the chamber to reflect pressure on the downstream side of the regulator valve. Thus, changes in pressure on the downstream side of the regulator valve cause movement of the diaphragm that, through mechanical linkages, can cause valve disc movement.

L-shaped levers can be used as part of these mechanical linkages. Such levers can be configured to provide a particular ratio between the amount of diaphragm movement and the amount of valve disc movement. This ratio and the forces applied are constant regardless of whether the valve is opening or closing and regardless of the position of the valve disc.

SUMMARY

In one aspect of the invention, a pressure regulator valve includes a valve seat separating a valve flowpath into an upstream region and a downstream region. A valve closure member is mounted on a valve stem, the valve stem operable to vary a separation between the valve seat and the valve closure member. A diaphragm is mounted in a housing with mobile portions of the diaphragm responding to changes of pressure in the downstream region by changing position relative to the housing. A diaphragm stem is attached to the diaphragm such that movement of the mobile portions of the diaphragm causes movement of the diaphragm stem. A linkage mechanically couples the diaphragm stem to the valve stem. The linkage includes four connected links, the links attached to each other at connection points which define connection angles that are a function of positions of the diaphragm stem and valve stem.

In another aspect of the invention, a method of regulating pressure in a downstream region of a flowpath, the downstream region separated from an upstream region by a valve, includes moving portions of a diaphragm in housing in response to changes of pressure in the downstream region such that a diaphragm stem attached to the diaphragm also moves. The method also includes translating movement of the diaphragm stem via a linkage to cause movement of a valve stem, the valve stem operable to change the flow capacity of the valve. The linkage includes four connected links, the links attached to each other at connection points which define connection angles that are a function of positions of the diaphragm stem and valve stem.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements. Terms such as top, bottom, vertical, and horizontal are used for clarity of description to note the relative locations of elements on the figures rather than to imply absolute relationships between such elements.

As used herein, fluid may include liquid, gas, or a combination of liquid and gas.

DETAILED DESCRIPTION

Figure 1:
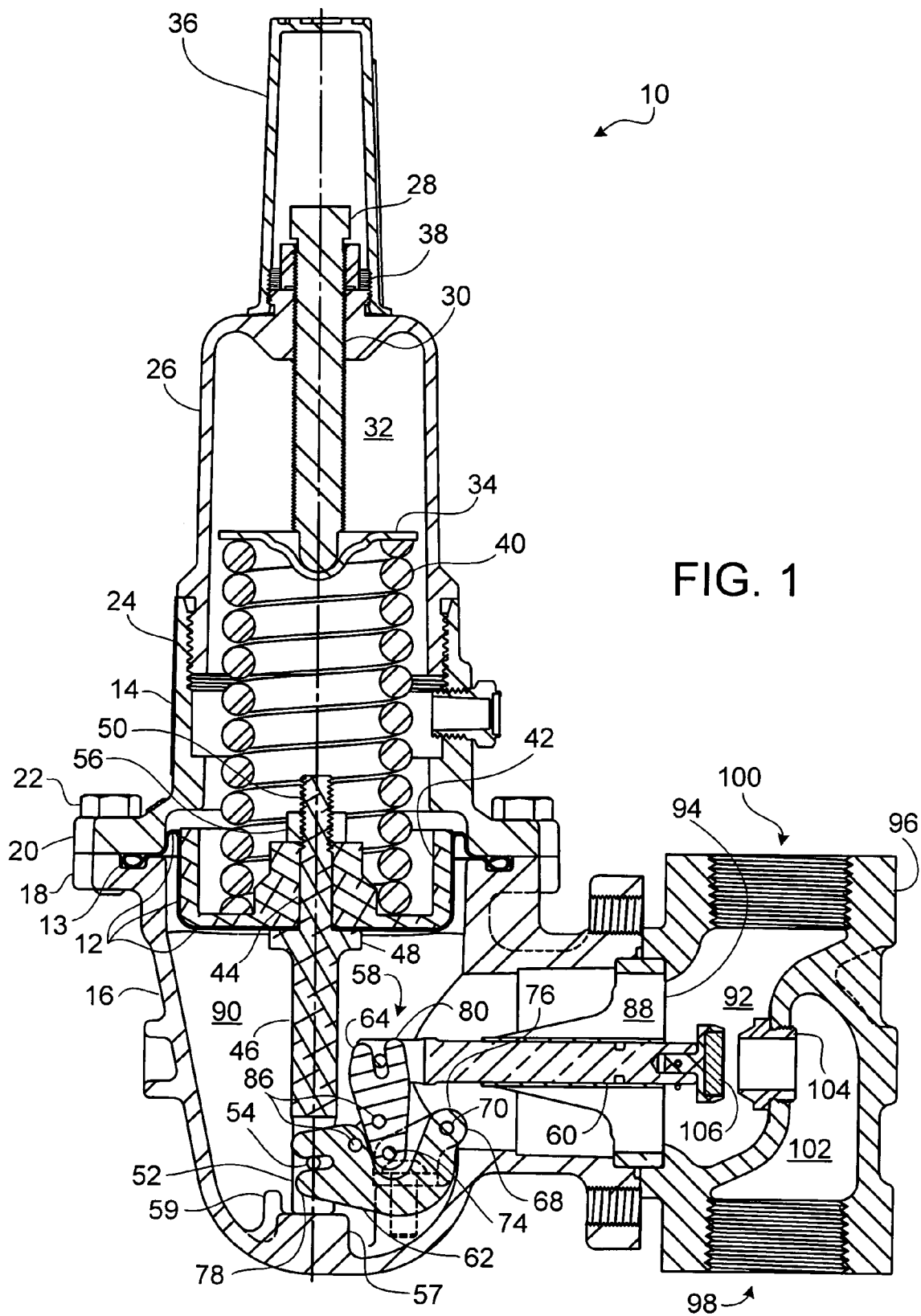
FIG. 1 is a cross-sectional view of a regulator valve taken along its centerline.

Referring to FIG. 1, a regulator valve 10 includes a diaphragm 12 between an upper casing 14 and a lower casing 16. Flanges 18, 20 and bolts 22 attach upper casing 14 and lower casing 16 to each other and hold cup-shaped diaphragm 12 in position by clamping diaphragm ends 13. Upper casing 14 includes a lower portion 24 and an upper portion 26 which are threadingly attached to each other. An adjustment screw 28 is threaded through a bore 30 in an upper portion 26 of upper casing 14. Adjustment screw 28 extends downward into an upper chamber 32, which is defined by upper casing 14 and diaphragm 12, to a spring follower 34. A cover 36 is attached to exterior threads 38 on upper portion 26 of upper casing 14 and protects adjustment screw 28 to reduce the likelihood of inadvertent movement of the adjustment screw.

A spring 40 extends from spring follower 34 to a diaphragm support member 42. Diaphragm support member 42 receives spring 40 and provides support for diaphragm 12. Diaphragm 12 extends inwards from diaphragm ends 13, across the annular space between diaphragm support member 42 and upper casing 14, and along the sides and lower surface of the diaphragm support member. Diaphragm support member 42 includes an axial bore 44 which receives diaphragm stem 46. Diaphragm stem 46 has central flanges 48, a threaded upper end 50, and a Y-shaped lower end with two legs 52 joined by a stem pin 54. Diaphragm stem 46 is inserted through a central hole in diaphragm 12 and through bore 44 of diaphragm support member 42 until central flanges 48 of the diaphragm stem contact the diaphragm. Nut 56 threaded over upper end 50 of diaphragm stem 46 secures the diaphragm stem in contact with diaphragm 12 and diaphragm support member 42. The lower end of diaphragm stem 46 contacts stop 57 when the diaphragm stem is at its lowest position. Stop 57 includes a projection 59 which limits lateral movement of diaphragm stem 46. Thus, movement of diaphragm 12 causes corresponding longitudinal movement of diaphragm stem 46.

Now referring also to FIG. 2, a linkage 58 connects diaphragm stem 46 to valve stem 60 and, as is described in more detail below, translates longitudinal motion of the diaphragm stem to longitudinal motion of the valve stem. As illustrated herein, valve stem 68 and diaphragm stem 86 are generally perpendicular. However, and it will be understood in the invention is not limited to such an embodiment. Linkage 58 includes a diaphragm link 62, a seat link 64, two connection links 66 (see FIG. 2), and a linkage retainer 68. Bolts 72 attach both sides of linkage retainer 68 to lower casing 16. Linkage retainer 68 is pivotably attached to diaphragm link 62 and seat link 64 by a pin 70 and a pin 74, respectively.

Diaphragm link 62 extends from a first end attached to linkage retainer 68 by pin 70 to a second end with two legs 78 which are inserted between legs 52 of diaphragm stem 46. Legs 78 of diaphragm link 62 bracket stem pin 54 that is disposed between legs 52 of diaphragm stem 46.

Seat link 64 extends from a first end attached to linkage retainer 68 by pin 74 to a second end with two legs 80 which are inserted between legs 82 of valve stem 60. Legs 80 of seat link 64 bracket a pin 84 that is disposed between legs 82 of valve stem 60.

Connection links 66 extend on both sides of diaphragm link 62 and seat link 64. Connection links 66 are attached to diaphragm link 62 and seat link 64 by pins 86.

Valve stem 60 extends axially through the center of a passage 88 defined by lower housing 16. Passage 88 extends from a lower chamber 90, defined by lower housing 16 and diaphragm 12, to a downstream flow chamber 92 of valve body 96. Valve stem 60 is positioned relative to the sides of passage 88 by a spoke assembly 94 which is mounted to lower housing 16. Spoke assembly 94 include spokes (not shown) extending inwards from lower housing 16 to bushings (not shown) which allow valve stem 60 to move axially within passage 88. Individual spokes are separated by sufficient space to permit substantially free fluid communication between downstream flow chamber 92 and lower chamber 90.

A valve body 96 defines a primary fluid flow path for regulatory valve 10 which extends from inlet 98 to outlet 100 through upstream flow chamber 102, annular valve seat 104, and downstream flow chamber 92. A valve closure member 106 sized to engage valve seat 104 is mounted on the end of valve stem 60. Axial movement of valve stem 60 moves valve closure member 106 relative to valve seat 104. In this instance, valve closure member 106 is configured as a disc. However, in other embodiments, the valve closure member can be, for example, a plug or seal that is conformable to the valve seat to limit flow through the valve.

In operation, regulator valve 10 is configured to maintain a pressure in downstream flow chamber 92 within a set range and, thus, provides a varying flow rate of fluid (e.g., natural gas) through the valve in response to variations in downstream demand. More specifically, the position of diaphragm stem 46 is established by the point of equilibrium between the downward force exerted on diaphragm 12 by spring 40 through diaphragm support member 42 and the upward force exerted on diaphragm 12 by fluid pressure in lower chamber 90 which is substantially equal to the pressure in downstream flow chamber 92.

Adjustment screw 28 positions spring follower 34 and, thus, the position of the upper end of spring 40. Adjustment screw 28 can be used to compensate for installation specific conditions including, for example, the condition of spring 40. In operation, adjustment screw 28 can be operated to set regulator valve 10 to be in equilibrium for a desired downstream pressure as measured by a pressure gauge while the system is under steady state flow conditions.

When the pressure in downstream flow chamber 92 is within the range established by a particular setting of adjustment screw 28, the separation between valve disc 106 and valve seat 104 has established a flow capacity for regulator valve 10 that matches the downstream load. If the downstream load increases, the pressure in downstream flow chamber 92 will begin to drop unless the flow through regulator valve 10 increases. The drop in pressure in downstream flow chamber 92 causes a substantially equivalent drop in pressure in lower chamber 90. This reduces the upward force applied to diaphragm 12. In response, spring 40 begins to expand, forcing diaphragm support member 42, diaphragm 12, and diaphragm stem 46 downward until a new equilibrium is achieved.

It will be understood that the valve 10 is not dependent on gravity for its operation and therefore up or down as used herein is not defined in relation to gravitational force directions. For ease of description as used herein, downward is used to describe longitudinal movement by stem 46 in a direction towards stop 57 and upwards is used to describe movement of stem 46 in a direction away from stop 57.

As diaphragm stem 46 moves downward, the engagement between diaphragm link 62 and the diaphragm stem causes the diaphragm link to pivot in a counterclockwise direction about pin 70. The movement of diaphragm link 62 is transmitted to seat link 64 by connection link 66. This causes seat link 64 to pivot in a counterclockwise direction about pin 74. The engagement between seat link 64 and valve stem 60 displaces the valve stem away from seat 104. This increases the separation between valve seat 104 and valve disc 106 thus increasing the flow capacity of regulator valve 10 and stabilizing the pressure in downstream flow chamber 92.

Similarly, as the downstream load decreases, the pressure in downstream flow chamber 92 will begin to rise unless the flow through regulator valve 10 decreases. Increasing pressure in lower chamber 90 moves the diaphragm 12 upwards against the resistance of spring 40. The resulting upward movement of diaphragm stem 46 is transmitted through linkage 58 and valve stem 60 to decrease the separation between valve seat 104 and valve disc 106 thus decreasing the flow capacity regulator valve 10.

Figure 2:
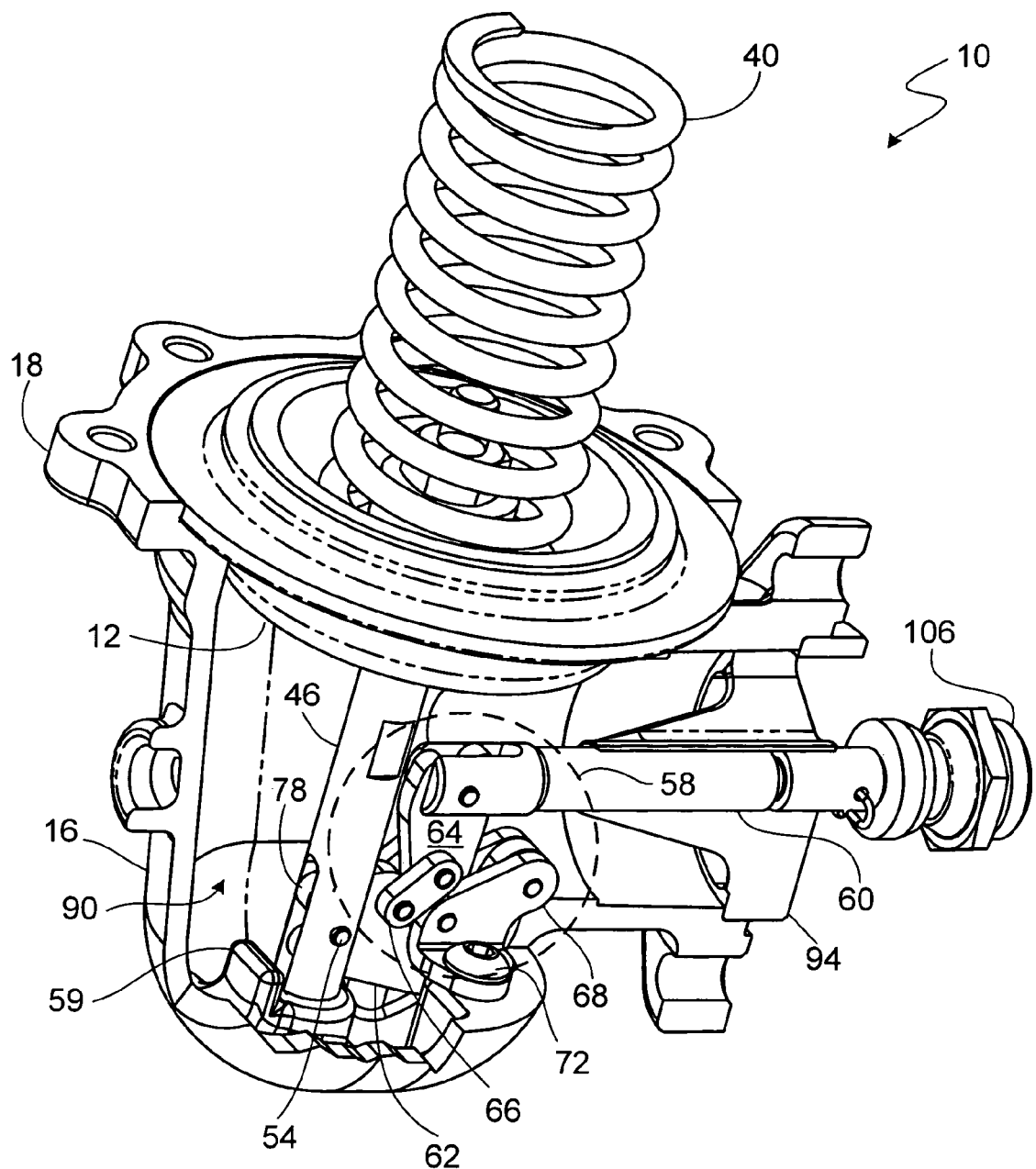
FIG. 2 is a cutaway perspective view of portions of the regulator valve of FIG. 1.
Figure 3:
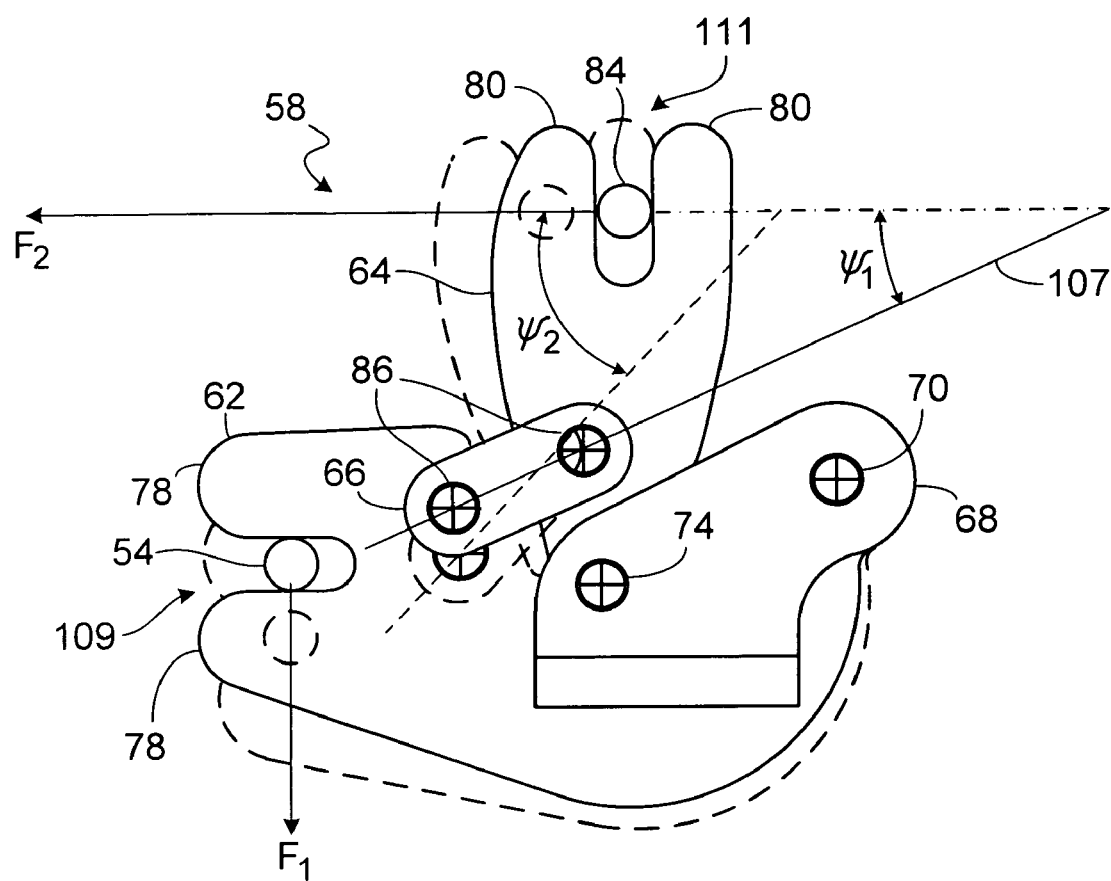
FIG. 3 is a comparative side view of the linkage of the regulator valve of FIG. 1 showing the differences between the regulator valve's open and closed positions.

Referring to FIGS. 2 and 3, linkage 58 is shown in FIG. 3 as it is when regulator valve 10 is in its fully closed position (solid lines) and as it is when the regulator valve is in its fully open position (broken lines with two intervening dashes). The relationship between diaphragm link 62, seat link 64, connection link 66, and linkage retainer 68 can be configured to provide a particular ratio between the amount of diaphragm movement and the amount of valve disc movement. However, the changing angles between the various links provide additional mechanical advantage to linkage 58 when the linkage is operating to move valve disc 106 towards valve seat 104. This can provide a tighter level of control for adjustments of the capacity of regulator valve 10. For example, in tests of one embodiment, the observed outlet pressure remained within 10% of the original set point as flow was varied. This can also provide improved mechanical reliability for regulator valve 10 by reducing the amount of spring relaxation required for fully opening the regulator valve. In addition, the amount of force applied varies with linkage position as the degree of mechanical advantage changes.

Referring to FIGS. 2 and 3, for example, as pressure decreases in lower chamber 90, movement of diaphragm stem 46 applies a force $F_1$ to the linkage through stem pin 54 that is transmitted through diaphragm link 62 to connection link 66 to seat link 64 to provide a force $F_2$ on pin 84 to induce movement of valve stem 60. As regulator valve 10 moves in response to input force $F_1$, the angles between the various links and forces transmitted therethrough change. This is possible, in part, because stem pin 54 is slidably received in slot 109 defined by legs 78 of diaphragm link 62 and pin 84 is slidably received in slot 111 defined by legs 80 of seat link 64. In a particular example, an interior angle $\psi$, defined between an axis 107 of connection link 66 and force $F_2$, ranges from $\psi_1$ when regulator valve 10 is in its closed position to $\psi_2$ in the open position. As discussed above, longitudinal movement of diaphragm stem 46 pivots diaphragm link 62 in a counterclockwise direction about pin 70 and pivots seat link 64 in a counterclockwise direction about pin 74. The resultant force on seat link 64 can be resolved into a first component parallel to valve stem 60 and a second component perpendicular to the valve stem. Because of the sliding engagement between the pin 84 and slot 111, only the first component parallel to valve stem 60 acts on the valve stem to provide force $F_2$. As angle $\psi$ increases, the second component perpendicular to valve stem 60 increases and the first component parallel to the valve stem decreases. Thus, as angle $\psi$ increases, the mechanical advantage or ratio between force $F_2$ and force $F_1$ (i.e., $F_2/F_1$) decreases. In some embodiments, interior angle $\psi$ has a range between about 15 and 60 degrees (e.g., between 25 and 50 degrees).

Figure 4:
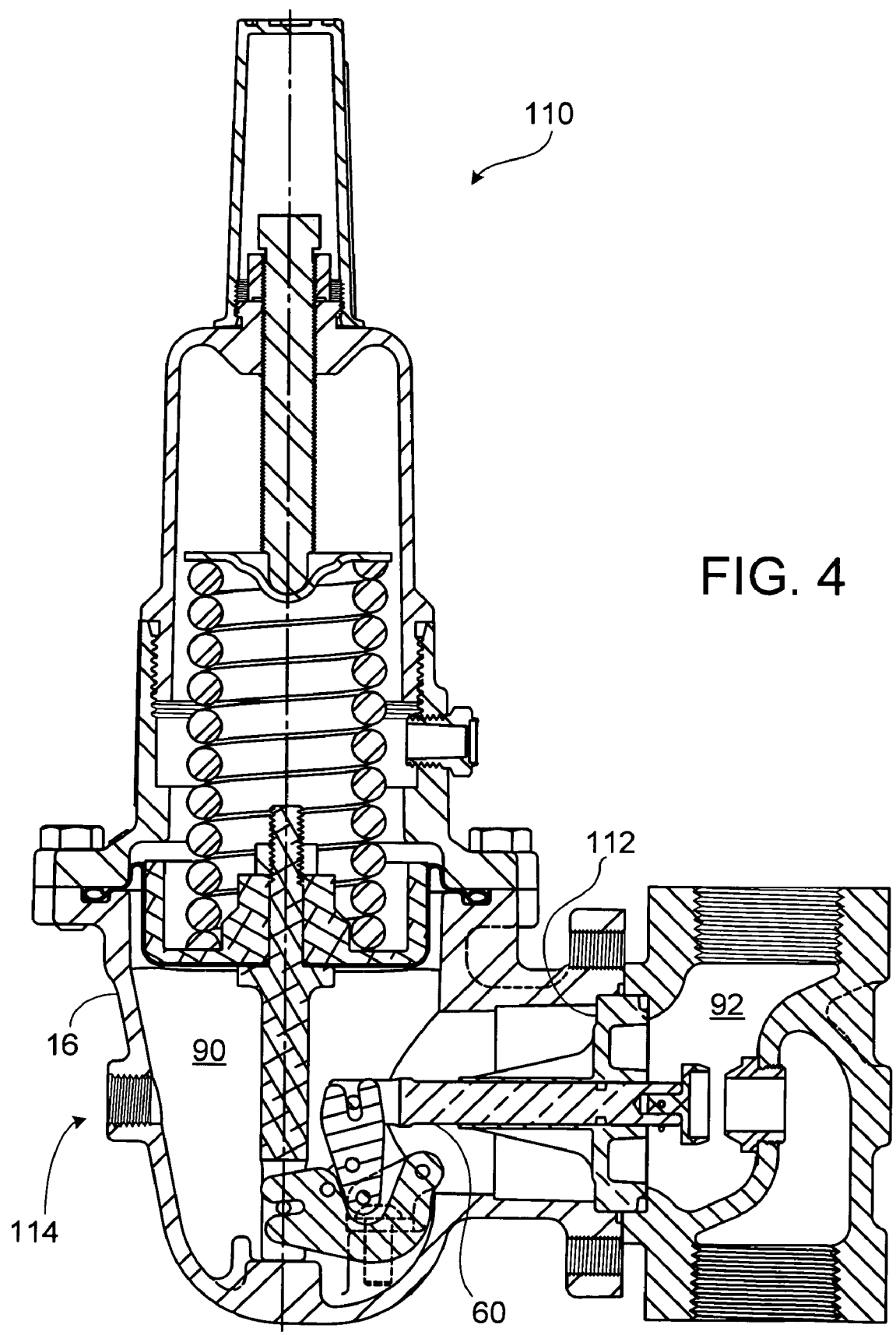
FIG. 4 is a cross-sectional view of an alternate regulator valve taken along its centerline.

Referring to FIG. 4, an alternate regulator valve 110 has similar construction and operation. The primary difference from above-described regulator valve 10 is that lower chamber 90 of regulator valve 110 is not in direct fluid communication with downstream flow chamber 92. Spoke assembly 94 of regulator valve 10 is replaced by annular support assembly 112 which substantially prevents fluid flow along the outside of valve stem 60 between lower chamber 90 and downstream flow chamber 92. Bore 114 provides an attachment point for piping (not shown) which extends from lower casing 16 to some portion of the flow path downstream of regulator valve 110. This piping provides for fluid communication and the transmission of a pressure signal through, for example, direct application of flow or through a pilot regulator to lower chamber 90.

Figure 5:
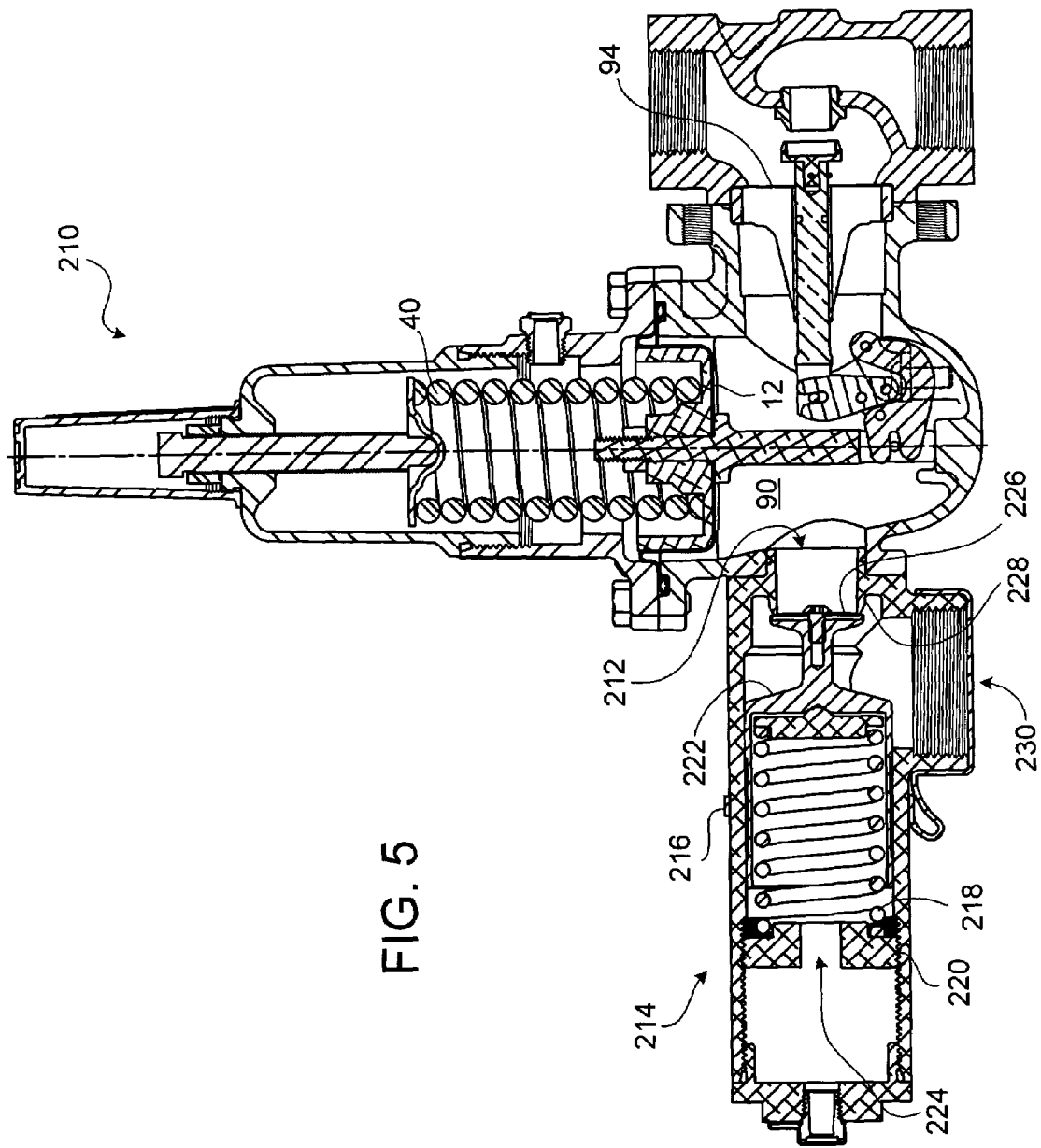
FIG. 5 is a cross-sectional view of another alternate regulator valve taken along its centerline.

Referring to FIG. 5, another alternate regulator valve 210 also has similar construction and operation. Regulator valve 210 includes a spoke assembly 94 as described above in the discussion of regulator valve 10. In this embodiment, an opening 212 in casing 16 is used as an attachment point for a pressure relief module 214. Pressure relief module 214 includes a casing 216 which is threadingly attached to opening 212. A relief module spring 218 extends axially within casing 216 from a spring adjustment fitting 220 to a spring seat 222. Spring adjustment fitting 220 includes exterior threads which engage interior threads of a casing 216. Spring adjustment fitting 220 also includes a central cavity 224 which is configured to receive an adjustment tool (not shown) such as, for example, a hex wrench. Relief module spring 218 biases a relief valve disc 226 towards engagement with a relief valve seat 228. Spring adjustment fitting 220 can be positioned such that increasing pressure in the lower chamber 90 will compress relief module spring 218 and disengage relief valve disc 226 from relief valve seat 228 before the increased pressure damages diaphragm 12 or spring 40. This allows fluid to flow through relief valve seat 228 and out aperture 230.

Figure 6:
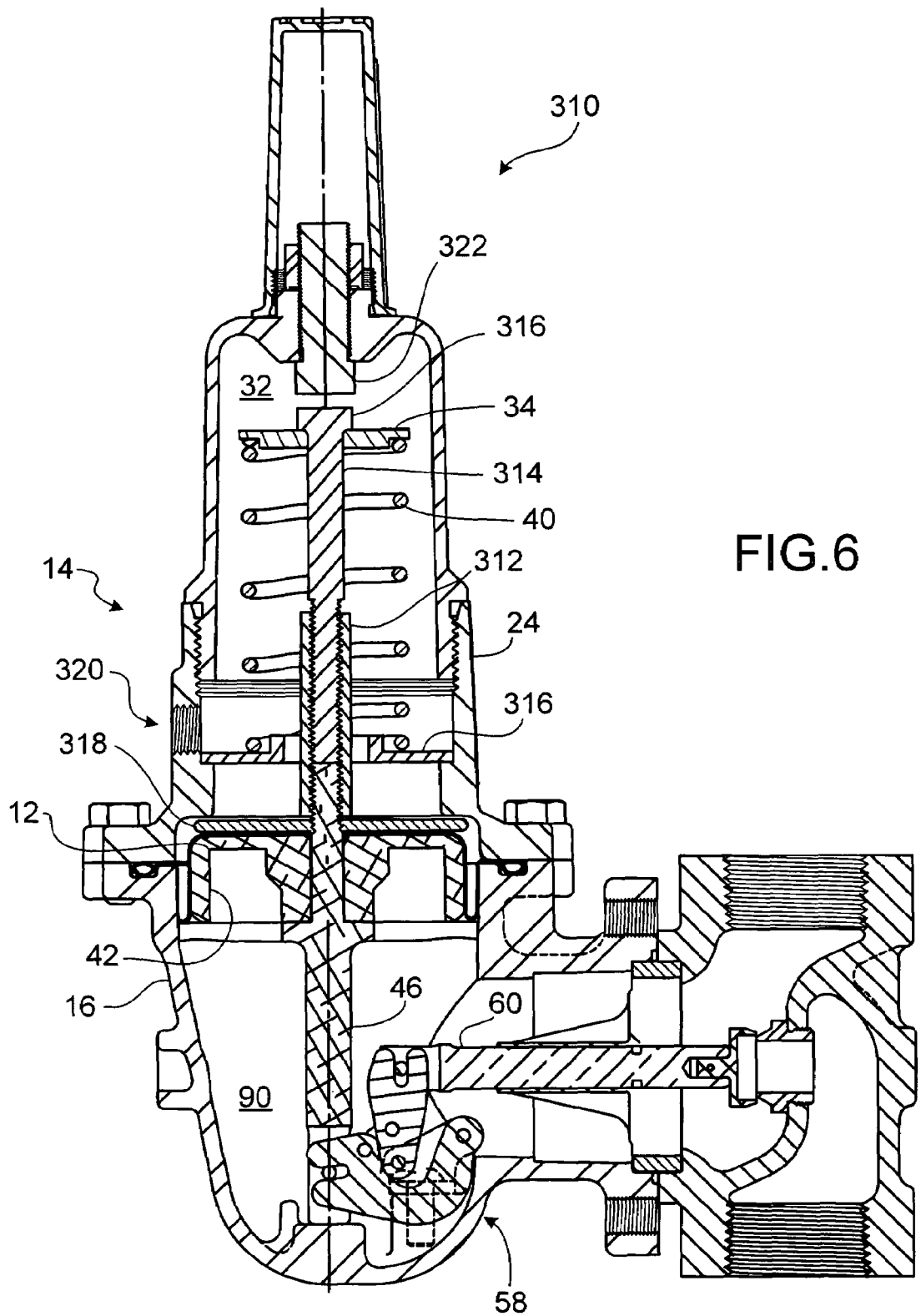
FIG. 6 is a cross-sectional view of another alternate regulator valve taken along its centerline.

Referring to FIG. 6, another alternate regulator valve 310 includes a similar linkage 58 between diaphragm stem 46 and valve stem 60. In this instance, an annular fitting 312 couples diaphragm stem 46 with stem extension 314. A lower end of spring 40 engages a lower spring seat 316 that is mounted in lower portion 24 of upper casing 14. Spring 40 extends upward around stem extension 314 to spring follower 34 and biases the spring follower upwards against shoulders 316 of the stem extension. Thus, spring 40 biases stem extension 314, diaphragm stem 46, and diaphragm 12 upwards rather than downwards as previously described. As previously described herein, the ends of diaphragm 12 are secured between upper casing 14 and lower casing 16. However, diaphragm support member 42 is inverted relative to its orientation in the previously described regulator valves and diaphragm 12 extends over the upper surface of the diaphragm support member between the diaphragm support member and a diaphragm disc 318. Diaphragm disc 318 can help protect diaphragm 12 from damage caused by wear.

An upper bore 320 in lower portion 24 of upper casing 14 provides an attachment point for a pressure loading mechanism (not shown). For example, a pilot regulator can be configured to increase/decrease the pressure in upper chamber 32 in response decreasing/increasing pressure at a point downstream of the regulator valve 310. Such pilot regulators are described in more detail in U.S. Pat. No. 6,354,319, the entire contents of which are incorporated herein by reference. The adjustment screw included in previously described regulator valves is omitted and replaced by a plug 322. In some instances, adjustment of the overall system is performed by calibrating and adjusting the pressure loading mechanism.

In operation, as pressure in upper chamber 32 increases due to loading from the pressure loading mechanism, diaphragm 12 and diaphragm support member 42 are moved downward against the bias of spring 40. Thus, increasing pressure in the upper chamber 32, rather than decreasing pressure in lower chamber 90, increases the flow capacity of regulator valve 310. Embodiments with a pilot regulator can provide the increased degree of control that is characteristic of pilot regulators as well as variable-rate control provided by multi-bar linkage 58.

A number of embodiments of the invention have been described. Nevertheless, it will be understood that various modifications may be made without departing from the spirit and scope of the invention. For example, an electronic control system could respond to electronic signals from a downstream pressure sensor by using a linear electronic solenoid to apply motive force to the linkage. In another example, more than four connected links could form the linkage between the diaphragm stem and valve stem. Accordingly, other embodiments are within the scope of the following claims.

What is claimed is:
1. A pressure regulator valve comprising:
    a valve seat separating a fluid flowpath into an upstream region and a downstream region;
    a valve closure member mounted on a valve stem, the valve stem operable to vary a separation between the valve seat and the valve closure member;
    a diaphragm mounted in a housing between a first interior region of the housing and a second interior region of the housing, the diaphragm including mobile portions responding to changes of pressure in one or both of the interior regions of the housing by changing position relative to the housing;

a diaphragm stem attached to the diaphragm such that movement of the mobile portions of the diaphragm causes movement of the diaphragm stem; and a linkage mechanically coupling the diaphragm stem to the valve stem, wherein the diaphragm stem slidingly engages a diaphragm link of the linkage and the valve stem slidingly engages a seat link of the linkage;

wherein the linkage includes at least four links, the links attached to each other at connection points, the linkage providing a mechanical advantage that increases as the valve stem is moved toward a closed position.

2. The valve of claim 1 wherein the linkage includes a linkage retainer mounted to the housing, the diaphragm link pivotably attached to the linkage retainer and engaging the diaphragm stem, the seat link pivotably attached to the linkage retainer and engaging the valve stem, and at least one connection link extending between the diaphragm link and the seat link.

3. The valve of claim 2 wherein an interior angle defined between the valve stem and an axis of a first connection link has a range between about 15 and 60 degrees.

4. The valve of claim 1 wherein the housing defines a passage extending between the second interior chamber and the downstream region.

5. The valve of claim 4 wherein the valve stem extends through the passage.

6. The valve of claim 1 further comprising a resilient member biasing the diaphragm.

7. The valve of claim 6 wherein the resilient member is a spring having a first end mechanically coupled to the diaphragm and a second end disposed away from the diaphragm.

8. The valve of claim 7 further comprising an adjustment screw operable to change a set position of the second end of the spring.

9. The valve of claim 7 wherein the spring biases the valve towards an closed position.

10. The valve of claim 9 wherein the spring is contained in the first interior chamber and the housing includes an attachment point for a pilot controlling pressure in the first interior chamber, the attachment point including an opening extending though the casing into the first interior region of the casing.

11. The valve of claim 1 wherein the housing comprises an attachment point for external piping extending from the housing to the downstream region, the attachment point including an opening extending though the casing into the second interior region of the casing.

12. The valve of claim 1 further comprising a pressure relief module in fluid communication with the second interior region of the casing.

13. The valve of claim 12 wherein the pressure relief module comprises:
a housing;
a relief valve seat defining a first aperture extending through the housing; and
a resilient member biasing a relief valve closure member towards engagement with the relief valve seat.

14. A method of regulating pressure in a downstream region of a fluid flowpath, the downstream region separated from an upstream region by a valve, the method comprising:
moving portions of a diaphragm in a housing of the valve in response to changes of pressure in the downstream region such that a diaphragm stem attached to the diaphragm also moves, the diaphragm stem being engaged with a mechanical linkage in the valve that includes at least four links, the links attached to each other at connection points; and translating movement of the diaphragm stem via the mechanical linkage to cause movement of a valve stem, wherein the movement of the diaphragm stem is less than the corresponding movement of the valve stem, the valve stem operable to change the flow capacity of the valve;

wherein the mechanical linkage provides an increasing mechanical advantage when the valve stem is moved toward a closed position.

15. The method of claim 14 wherein the linkage includes a linkage retainer mounted to the housing, a diaphragm link pivotably attached to the linkage retainer and engaging the diaphragm stem, a seat link pivotably attached to the linkage retainer and engaging the valve stem, and at least one connection link extending between the diaphragm link and the seat link.

16. The method of claim 14 wherein the step of translating movement of the diaphragm stem via a linkage to cause movement of a valve stem comprises providing a mechanical advantage through the linkage that varies as relative positions of the links change.

17. The method of claim 14 wherein the step of moving portions of a diaphragm in a housing comprises providing fluid communication between an interior chamber of the housing at least partially defined by the diaphragm and the downstream region such that pressure changes in the downstream region vary forces applied to the diaphragm.

18. The method of claim 14 wherein the diaphragm stem is slidingly engaged with a diaphragm link of mechanical linkage and the valve stem is slidingly engaged with seat link of the mechanical linkage.

19. A pressure regulator valve comprising:
a valve seat separating a fluid flowpath into an upstream region and a downstream region;
a valve closure member mounted on a valve stem, the valve stem moving the valve closure member relative to the valve seat;
a diaphragm mounted in a housing between a first interior region of the housing and a second interior region of the housing, the diaphragm including movable portions that shift in response to pressure changes in one or both of the interior regions of the housing;
a diaphragm stem attached to the diaphragm such that movement of the movable portions of the diaphragm causes movement of the diaphragm stem; and
a linkage mechanically coupling the diaphragm stem to the valve stem, wherein the diaphragm stem slidingly engages a diaphragm link of the linkage and the valve stem slidingly engages a seat link of the linkage, the linkage including at least four links attached together at connection points,
wherein the linkage translates an input longitudinal movement of the diaphragm stem to an output longitudinal movement of the valve stem, the output longitudinal movement of the valve stem being greater than the input longitudinal movement of the diaphragm stem.

20. The valve of claim 19 wherein the linkage provides a first mechanical advantage when the valve stem is moved toward a closed position, the first mechanical advantage being greater than a second mechanical advantage provided by the linkage when the valve stem is moved toward an opened position.

21. The valve of claim 20 wherein the linkage includes a linkage retainer mounted to the housing, the diaphragm link pivotably attached to the linkage retainer and engaging the diaphragm stem, the seat link pivotably attached to the linkage retainer and engaging the valve stem, and at least one connection link extending between the diaphragm link and the seat link.

22. The valve of claim 21 further comprising a spring member that acts upon the diaphragm to bias the valve stem towards one of the open position or the closed position.

23. The valve of claim 22 further comprising a pressure relief module in fluid communication a space adjacent the diaphragm, the pressure relief module including: a housing, a relief valve seat defining a first aperture extending through the housing, and a resilient member biasing a relief valve closure member towards engagement with the relief valve seat.

* * * * *